United States Patent
Saito et al.

(10) Patent No.: US 9,993,804 B2
(45) Date of Patent: Jun. 12, 2018

(54) CATALYST FOR EXHAUST GAS PURIFICATION

(71) Applicants: TOYOTA JIDOSHA KABUSHIKI KAISHA, Toyota-shi, Aichi-ken (JP); CATALER CORPORATION, Kakegawa-shi, Shizuoka-ken (JP)

(72) Inventors: Yoshinori Saito, Toyota (JP); Masahide Miura, Toyota (JP); Tetsuhiro Hirao, Kakegawa (JP); Masanao Sato, Kakegawa (JP); Hirotaka Ori, Kakegawa (JP)

(73) Assignees: TOYOTA JIDOSHA KABUSHIKI KAISHA, Toyota-shi, Aichi-ken (JP); CATALER CORPORATION, Kakegawa-shi, Shizuoka-ken (JP)

( * ) Notice: Subject to any disclaimer, the term of this patent is extended or adjusted under 35 U.S.C. 154(b) by 0 days. days.

(21) Appl. No.: 15/482,045

(22) Filed: Apr. 7, 2017

(65) Prior Publication Data
US 2017/0291163 A1 Oct. 12, 2017

(30) Foreign Application Priority Data
Apr. 12, 2016 (JP) .................................. 2016-079849

(51) Int. Cl.
*B01J 21/04* (2006.01)
*B01J 21/06* (2006.01)
(Continued)

(52) U.S. Cl.
CPC ............... *B01J 23/63* (2013.01); *B01J 35/04* (2013.01); *B01J 37/0036* (2013.01); *B01J 37/0215* (2013.01)

(58) Field of Classification Search
CPC ... B01J 23/10; B01J 23/40; B01J 23/42; B01J 23/44; B01J 23/46; B01J 23/56;
(Continued)

(56) References Cited

U.S. PATENT DOCUMENTS

| 6,762,147 B2 * | 7/2004 | Morikawa ............ B01D 53/944 423/592.1 |
| 6,852,665 B2 * | 2/2005 | Morikawa ............ B01D 53/945 502/302 |

(Continued)

FOREIGN PATENT DOCUMENTS

JP 09-253454 A 9/1997

*Primary Examiner* — Cam N. Nguyen
(74) *Attorney, Agent, or Firm* — Sughrue Mion, PLLC (57) ABSTRACT

A catalyst for exhaust gas purification is described which includes a substrate and a catalyst coating layer provided on the substrate. The catalyst coating layer includes first and second metal oxide particles. The first metal oxide particles have a catalyst metal supported thereon, and the second metal oxide particles do not have a catalyst metal supported thereon. The first and second metal oxide particles have a specific particle size. This is because, when the sizes of the particles supporting the catalyst metal remain relatively large but the sizes of the particles not supporting a catalyst metal are minimized, it is possible to decrease the thickness of the catalyst coating layer while maintaining durability and improving gas diffusibility of the coating layer. Therefore, a thickness of the catalyst coating is decreased without decreasing durability, and the catalyst can exhibit high exhaust gas purification performance even under high load conditions.

8 Claims, 9 Drawing Sheets

(51) Int. Cl.
*B01J 21/08* (2006.01)
*B01J 21/12* (2006.01)
*B01J 23/10* (2006.01)
*B01J 23/40* (2006.01)
*B01J 23/42* (2006.01)
*B01J 23/44* (2006.01)
*B01J 23/46* (2006.01)
*B01J 23/56* (2006.01)
*B01J 23/63* (2006.01)
*B01J 35/02* (2006.01)
*B01J 35/04* (2006.01)
*B01J 37/00* (2006.01)
*B01J 37/02* (2006.01)

(58) Field of Classification Search
CPC . B01J 23/63; B01J 35/023; B01J 35/04; B01J 37/0036; B01J 37/0215; B01J 21/04; B01J 21/066; B01J 21/08; B01J 21/12
See application file for complete search history.

(56) References Cited

U.S. PATENT DOCUMENTS

| | | | |
|---|---|---|---|
| 7,638,460 B2* | 12/2009 | Nakamura | B01D 53/945 502/258 |
| 9,034,287 B2* | 5/2015 | Gerlach | B01J 29/7415 423/213.5 |
| 9,321,042 B2* | 4/2016 | Hoke | B01J 37/0244 |
| 9,339,794 B2* | 5/2016 | Nagashima | B01J 23/63 |
| 9,511,360 B2* | 12/2016 | Wille | B01J 23/40 |
| 9,579,638 B2* | 2/2017 | Fedeyko | B01D 53/8628 |
| 9,616,386 B2* | 4/2017 | Hatanaka | B01J 21/066 |
| 9,687,785 B2* | 6/2017 | Chen | B01D 53/9472 |
| 9,687,786 B2* | 6/2017 | Chen | B01D 53/9472 |
| 2011/0094211 A1* | 4/2011 | Kikuchi | B01D 53/945 60/299 |
| 2012/0053050 A1* | 3/2012 | Shiratori | B01D 53/945 502/240 |
| 2015/0217286 A1* | 8/2015 | Wille | B01J 37/30 502/304 |
| 2017/0021336 A1* | 1/2017 | Wille | B01J 23/40 |

* cited by examiner

COMPARATIVE EXAMPLE

CATALYST FOR EXHAUST GAS PURIFICATION

INCORPORATION BY REFERENCE

The disclosure of Japanese Patent Application No. 2016-079849 filed on Apr. 12, 2016 including the specification, drawings and abstract is incorporated herein by reference in its entirety.

BACKGROUND

1. Technical Field

The present disclosure relates to a catalyst for exhaust gas purification, and more specifically, to a catalyst for exhaust gas purification in which metal oxide particles included in a catalyst coating layer have a characteristic size and composition.

2. Description of Related Art

Harmful gases such as carbon monoxide (CO), nitrogen oxides (NOx), and unburned hydrocarbons (HC) are included in exhaust gases discharged from internal combustion engines such as automobiles. A catalyst for exhaust gas purification that decomposes such harmful gases is also called a three-way catalyst. Catalysts in which a catalyst coating layer is provided by wash-coating a slurry including particles of a metal oxide on which a noble metal having catalyst activity is supported and particles of another metal oxide onto a honeycomb-shaped monolith substrate made of a cordierite are known. As the metal oxide used in a catalyst for exhaust gas purification, ceria-zirconia composite oxides, alumina-ceria-zirconia composite oxides, and alumina, which have an oxygen storage capacity, are generally used.

Catalysts for exhaust gas purification in the related art have problems in that a catalyst supporting layer is in a relatively dense state, pores in the supporting layer are blocked due to (i) heating and (ii) poisoning components, gas diffusion into the supporting layer is insufficient, and thus catalyst performance decreases while it is used in a high temperature range. On the other hand, in Japanese Patent Application Publication No. 1997-253454 (JP 1997-253454 A), a catalyst coating layer having a two-layer structure including a lower layer formed of oxide porous particles having an average particle size of 1 to 5 μm and an upper layer formed of oxide porous particles having an average particle size of 10 to 20 μm is proposed to address the above problems.

SUMMARY

It is known that durability improves as a coating amount of a catalyst coating layer increases in a catalyst for exhaust gas purification. However, as the catalyst coating layer becomes thicker, gas diffusibility in the coating layer decreases, and utilization efficiency of a catalyst metal such as a noble metal decreases. In particular, under conditions in which an amount of intake air is large, for example, during acceleration (a high volume intake air amount (Qa) or a high mass intake air amount (Ga) condition: the same meaning as a high space velocity (SV) condition), purification performance of a catalyst is determined by gas diffusion. Therefore, in order to exhibit sufficient catalyst performance even under high load conditions, it is necessary to ensure gas diffusibility in the catalyst coating layer. Decreasing particle sizes of all materials is considered in order to minimize a thickness of the catalyst coating layer, but it causes sintering of a noble metal having catalyst activity and decreases durability, which is not preferable. It is necessary to achieve both improvement of durability of the catalyst coating layer and improvement of catalyst performance, which are not compatible.

The inventors conducted studies to address the above problems and found that, when particles supporting a catalyst metal remain in relatively large sizes but sizes of particles not supporting a catalyst metal are minimized among metal oxide particles included in a catalyst coating layer, it is possible to decrease a thickness of the catalyst coating layer while maintaining durability and improve gas diffusibility of the coating layer.

A first aspect of the present disclosure relates to a catalyst for exhaust gas purification comprising a substrate and a catalyst coating layer provided on the substrate. In the catalyst coating layer, a secondary particle size D50 of all material particles included in the catalyst coating layer is in a range of 2 to 12 μm and which includes first metal oxide particles supporting a catalyst metal and second metal oxide particles not supporting a catalyst metal. The second metal oxide particles have a secondary particle size D50 that is 3 μm or less and a content ratio that is in a range of 5 to 55 weight % with respect to all material particles of the catalyst coating layer, and a secondary particle size D50 of the first metal oxide particles is greater than the secondary particle size D50 of the second metal oxide particles.

A covering amount of the catalyst coating layer may be in a range of 50 to 300 g/L, per unit volume of the substrate.

A porosity of the catalyst coating layer may be in a range of 50 to 80 volume % as a porosity measured according to an underwater gravimetric method. An equivalent circle diameter of a pore in a cross-sectional image of a cross section of the catalyst coating layer perpendicular to a direction of the substrate in which an exhaust gas flows among pores included in the catalyst coating layer may be in a range of 2 to 50 μm. A aspect ratio pore having an aspect ratio of 5 or more may be 0.5 to 50 volume % with respect to all voids included in the catalyst coating layer and an average aspect ratio thereof may be in a range of 10 to 50.

A second aspect of the present disclosure relates to a method of preparing a catalyst for exhaust gas purification. The preparation method includes preparing first metal oxide particles supporting a catalyst metal and second metal oxide particles not supporting a catalyst metal; milling the second metal oxide particles so that a secondary particle size D50 is 3 μm or less; preparing a slurry which is obtained by mixing the first metal oxide particles and the milled second metal oxide particles and in which a secondary particle size D50 of all material particles is in a range of 2 to 12 μm and the second metal oxide particles are included in a range of 5 to 55 weight % with respect to all material particles; and applying the slurry onto a substrate to form a catalyst coating layer.

A fibrous organic substance may be additionally added to the slurry.

In the catalyst for exhaust gas purification of the present disclosure, when a particle size and a content ratio of materials included in the catalyst coating layer are designed as described above, it is possible to decrease a thickness of the catalyst coating without deteriorating durability and exhibit high exhaust gas purification performance under high load conditions.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A catalyst for exhaust gas purification according to an embodiment of the present disclosure includes a catalyst coating layer provided on a substrate and a secondary particle size D50 of all material particles included in the catalyst coating layer is in a range of 2 to 12 µm. The catalyst coating layer includes first metal oxide particles supporting a catalyst metal and second metal oxide particles not supporting a catalyst metal. The second metal oxide particles have a secondary particle size D50 that is 3 µm or less and have a content ratio that is in a range of 5 to 55 weight % with respect to all material particles of the catalyst coating layer. Further, a secondary particle size D50 of the first metal oxide particles is greater than a secondary particle size D50 of the second metal oxide particles.

(Substrate) As the substrate, for example, a known substrate having a honeycomb shape can be used. Specifically, a honeycomb-shaped monolith substrate (such as a honeycomb filter and a high density honeycomb) and the like are appropriately used. In addition, a material of such a substrate is not particularly limited, and a substrate made of ceramics such as cordierite, silicon carbide, silica, alumina, and mullite and a substrate made of a metal such as stainless steel including chromium and aluminum are appropriately used. Among these, cordierite is preferably used in consideration of costs.

(Catalyst coating layer) The catalyst coating layer is formed on a surface of the above substrate and may be formed in only one layer or multiple layers, for example, two or more layers. When the catalyst coating layer is formed in multiple layers, the catalyst coating layer described in the present disclosure may be any of the layers. In addition, the catalyst coating layer may not necessarily be uniform over the entire substrate of the catalyst for exhaust gas purification, but may have a different composition in each zone, for example, on the upstream side and the downstream side with respect to a direction in which an exhaust gas flows, for each part of the substrate. In this case, the catalyst coating layer described in the present disclosure may be in any part.

The catalyst coating layer described in the present disclosure includes first metal oxide particles supporting a catalyst metal and second metal oxide particles not supporting a catalyst metal. The catalyst metal refers to a metal that functions as a main catalyst during purification of CO, NOx or HC. As specific examples thereof, noble metals such as platinum (Pt), palladium (Pd), rhodium (Rh), gold (Au), silver (Ag), iridium (Ir) and ruthenium (Ru) may be exemplified. Among these, in consideration of catalyst performance, at least one selected from the group including Pt, Rh, Pd, Ir and Ru is preferable, and at least one selected from the group including Pt, Rh and Pd is particularly preferable. The catalyst metal is supported on a surface of a primary particle or a secondary particle of the first metal oxide particles.

As the first metal oxide and the second metal oxide, specifically, aluminum oxide ($Al_2O_3$, alumina), cerium oxide ($CeO_2$, ceria), zirconium oxide ($ZrO_2$, zirconia), silicon oxide ($SiO_2$, silica), yttrium oxide ($Y_2O_3$, yttria) and neodymium oxide ($Nd_2O_3$), and composite oxides thereof, for example, a ceria-zirconia composite oxide and a ceria-zirconia-alumina composite oxide, may be exemplified. The first metal oxide particles supporting a catalyst metal are preferably metal oxides having an oxygen storage capacity such as, preferably, a ceria-zirconia composite oxide or a ceria-zirconia-alumina composite oxide. In addition, among the above metal oxides, alumina is particularly useful because it can improve heat resistance of the catalyst coating layer. In an embodiment of the present disclosure, the first metal oxide supporting a catalyst metal is preferably a ceria-zirconia-alumina composite oxide. In addition, in an embodiment of the present disclosure, the second metal oxide not supporting a catalyst metal is preferably alumina or a metal oxide that includes alumina at 50 weight % or more, particularly 60 weight % or more, and specifically 70 weight % or more or preferably 80 weight % or more.

Preferably, the catalyst coating layer mainly includes the first metal oxide particles supporting a catalyst metal and the second metal oxide particles not supporting a catalyst metal, and may include other components in addition to these particles. The other components may be derived from other metal oxides used in a catalyst coating layer for this type of application, an additive, or a binder used when a slurry for forming a catalyst coating is prepared. Specifically, one or more types of the above-described metal oxides, alkali metals such as potassium (K), sodium (Na), lithium (Li), and cesium (Cs), alkaline earth metals such as barium (Ba), calcium (Ca), and strontium (Sr), rare earth elements such as lanthanum (La), yttrium (Y), and cerium (Ce), and transition metals such as iron (Fe) may be exemplified. For example, alumina particles derived from an alumina-based binder used in a slurry for forming a catalyst coating may be included in the catalyst coating layer.

The secondary particle size D50 of all material particles included in the catalyst coating layer is 2 μm or more, preferably 3 μm or more and 12 μm or less and preferably 11 μm or less, and more preferably 10 μm or less. Within such ranges, there is no problem in durability of the coating layer, the coating layer does not easily peel off, and gas diffusibility in the coating layer can be sufficiently ensured. Here, when at least the first metal oxide particles supporting a catalyst metal and the second metal oxide particles not supporting a catalyst metal are included, "all material particles" included in the catalyst coating layer refers to other component particles included in addition to the above-described particles. Note that the "secondary particle" herein refers to an aggregate formed of a plurality of collected particles (primary particles) that are determined to form one unit from an appearance form and the "secondary particle size D50" refers to a cumulative 50% of a diameter in a volume-based cumulative particle size distribution of such secondary particles. The secondary particle size D50 can be measured using a laser diffraction particle size distribution measuring device using a slurry containing moisture without diluting the slurry or after the slurry is diluted.

The second metal oxide particles not supporting a catalyst metal have a secondary particle size D50 that is 3 μm or less, preferably 2 μm or less, and more preferably 1.5 μm or less. Further, the secondary particle size D50 of the first metal oxide particles is greater than the secondary particle size D50 of the second metal oxide particles. That is, a particle size of the second metal oxide particles is relatively smaller than a particle size of other materials included in the catalyst coating layer, particularly, the first metal oxide particles supporting a catalyst metal. By decreasing only a particle size of the second metal oxide particles, the second metal oxide particles in the catalyst coating layer have a dense distribution. As a result, a thickness of the catalyst coating layer decreases and an effect of improving gas diffusibility is obtained. However, when a particle size of the second metal oxide particles is too small, the catalyst coating layer becomes excessively dense and gas diffusibility resultantly deteriorates. Therefore, the secondary particle size D50 of the second metal oxide particles is preferably 0.1 μm or more.

Unlike the second metal oxide particles described above, the first metal oxide particles supporting a catalyst metal have particle sizes the same as or greater than particles supporting a catalyst metal in an exhaust gas purification catalyst in the related art. Therefore, sintering of the catalyst metal is unlikely to occur and heat resistance does not deteriorate. When a particle size of the first metal oxide particles is excessively large, an effect of decreasing a thickness of the coating layer due to the decreased particle size of the second metal oxide particles may be considered to be less likely to be exhibited. However, when the secondary particle size D50 of all material particles is adjusted to be within the above-described range, such problems do not occur. With respect to all material particles included in the catalyst coating layer, a ratio of the second metal oxide particles is in a range of 5 to 55 weight %, preferably a range of 10 to 55 weight %, and more preferably a range of 10 to 50 weight %. When a content ratio of the second metal oxide particles is within such ranges, an effect of decreasing a thickness of the coating layer due to the decreased particle size is obtained and an influence from a decrease in durability due to the decreased particle size is not exerted on the entire catalyst.

The catalyst coating layer described in the present disclosure preferably has a thickness in a range of 25 to 160 μm as an average value of the entire catalyst. When the catalyst coating layer is too thin, sufficient catalyst performance is not obtained. On the other hand, when the catalyst coating layer is too thick, a pressure loss during flow of an exhaust gas and the like increases and sufficient catalyst performance such as NOx purification performance is not obtained. However, such problems do not occur in the above ranges. Also, in consideration of a balance of a pressure loss, catalyst performance, and durability, a range of 30 to 96 μm is preferable and a range of 32 to 92 μm is more preferable. Here, the "thickness" of the catalyst coating layer refers to a length of the catalyst coating layer in a direction perpendicular to a center of a flat portion of the substrate, that is, a shortest distance between a surface of the catalyst coating layer and a surface (when there is another catalyst coating layer between the catalyst coating layer and the substrate, an interface between the other catalyst coating layer and the catalyst coating layer) of the substrate. An average thickness of the catalyst coating layer can be calculated by observing the catalyst coating layer using, for example, a scanning electron microscope (SEM) or an optical microscope, measuring thicknesses of an arbitrary 10 or more parts, and calculating an average value of the thicknesses.

A covering amount for each layer of the catalyst coating layer is preferably in a range of 50 to 300 g/L, per unit volume of a substrate. When the covering amount is too small, since catalyst activity performance of catalyst particles is not sufficiently obtained, sufficient catalyst performance such as NOx purification performance is not obtained. On the other hand, when the covering amount is too large, a pressure loss increases and poor fuel efficiency is caused. However, such problems do not occur in the above range. Also, in consideration of a balance of a pressure loss, catalyst performance and durability, a covering amount for each layer of the catalyst coating layer is in a range of 50 to 250 g/L and particularly preferably 100 to 250 g/L, per unit volume of a substrate.

(Catalyst coating layer structure having excellent gas diffusibility) When the catalyst coating layer has a porous structure having excellent gas diffusibility, according to a synergistic effect with the decreased particle size of the second metal oxide particles not supporting a catalyst metal, it is possible to further improve catalyst performance under high Ga conditions. Therefore, in an embodiment of the present disclosure, the catalyst coating layer includes many voids. A porosity thereof is preferably in a range of 50 to 80 volume % as a porosity that is measured using an underwater gravimetric method according to a method defined in JISR2205. When the porosity is too high, since diffusibility becomes too strong, a proportion of gases that pass through the coating layer without coming in contact with a catalyst active point increases and sufficient catalyst performance is not obtained. However, such problems do not occur in the above range.

When high aspect ratio pores having an aspect ratio of 5 or more are included at 0.5 to 50 volume % with respect to all of the above voids, it is preferable because communication between voids is excellent. In such high aspect ratio pores, an equivalent circle diameter of a pore in a cross-sectional image of a cross section of the catalyst coating layer perpendicular to a direction in which an exhaust gas flows is in a range of 2 to 50 μm, and an average aspect ratio is in a range of 10 or more and particularly preferably a range of 50 or less. Also, a proportion of high aspect ratio pores with respect to all voids is in a range of 0.6 to 40.9 volume % and particularly preferably a range of 1 to 31 volume % in consideration of a balance of gas diffusibility, catalyst performance, and a strength of the catalyst coating layer. A proportion of high aspect ratio pores with respect to all voids in the catalyst coating layer can be obtained by dividing a porosity of high aspect ratio pores in ranges of 500 μm or more in a horizontal direction of the catalyst coating layer with respect to a flat portion of the substrate, 25 μm or more in a direction perpendicular to a flat portion of the substrate, and 1000 μm or more in an axial direction or in ranges corresponding thereto by a porosity of the catalyst coating layer obtained by measurement according to an underwater gravimetric method.

When the average aspect ratio of the high aspect ratio pores is too small, sufficient communication between pores (pore communicability) is not obtained. On the other hand, when the average aspect ratio of the high aspect ratio pores is too high, since gas diffusibility becomes too strong, a proportion of gases that pass through the coating layer without coming in contact with a catalyst active point increases and sufficient catalyst performance is not obtained. However, when the average aspect ratio is within a range of 10 to 50, such problems do not occur. In order to achieve both gas diffusibility and catalyst performance, the average aspect ratio of the high aspect ratio pores is in a range of 10 to 35, and particularly, more preferably a range of 10 to 30.

The average aspect ratio of the high aspect ratio pores in the catalyst coating layer can be measured by analyzing a cross-sectional image of a cross section of the catalyst coating layer perpendicular to a direction of a substrate in which an exhaust gas flows (an axial direction of a honeycomb-shaped substrate) from 3D information of pores of the catalyst coating layer obtained using a Focused Ion Beam-Scanning Electron Microscope (FIB-SEM) or an X-ray CT.

Further, the high aspect ratio pore is preferably oriented in a range of 0 to 45 degrees at a value of a cumulative 80% angle in a cumulative angle distribution of an angle reference of an angle (a cone angle) formed by a major axis direction vector of the pore and a vector of a substrate in a direction in which an exhaust gas flows. Accordingly, gas diffusibility in the direction in which an exhaust gas flows is particularly improved and it is possible to improve utilization efficiency of the catalyst active point. When a value at a cumulative 80% angle is too large, a gas diffusibility component in the axial direction becomes insufficient, and utilization efficiency of the active point tends to decrease. However, such problems do not occur in the above range. Also, a value at the cumulative 80% angle is in a range of 15 to 45 degrees and particularly preferably a range of 30 to 45 degrees in consideration of catalyst performance.

The inventors have studied to improve catalyst performance by further improving gas diffusibility of the catalyst coating layer, and thus confirmed that the catalyst coating layer satisfying the following conditions has significantly excellent gas diffusibility and can exhibit excellent catalyst performance under high Ga conditions. The conditions refer to conditions in which a covering amount of the catalyst coating layer is in a range of 50 to 300 g/L, per unit volume of a substrate, an average thickness of the catalyst coating layer is in a range of 25 to 160 μm, a particle size of the catalyst particles is in a range of 3 to 10 μm as a value at a cumulative 15% of a diameter in a cumulative particle size distribution based on cross-sectional areas of catalyst particles according to observation of a cross section of the catalyst coating layer using a scanning electron microscope (SEM), a porosity of the catalyst coating layer is in a range of 50 to 80 volume % as a porosity measured using an underwater gravimetric method, an equivalent circle diameter of a pore in a cross-sectional image of a cross section of the catalyst coating layer perpendicular to a direction of a substrate in which an exhaust gas flows among pores in the catalyst coating layer is in a range of 2 to 50 μm, an average aspect ratio of the high aspect ratio pores having an aspect ratio of 5 or more is in a range of 10 to 50, and an occupancy rate of the high aspect ratio pores with respect to all voids is in a range of 0.5 to 50 volume %.

In the catalyst coating layer whose gas diffusibility is improved due to the inclusion of many voids, the thickness of the coating layer increases with respect to the coating amount according to the inclusion of voids. As described above, an increase in the thickness of the coating layer is not preferable because it can cause a decrease in gas diffusibility. However, when the present disclosure is applied to such a catalyst coating layer and the second metal oxide particles not supporting a catalyst metal decrease, it is possible to suppress an increase in the thickness of the coating layer and improve synergistic catalyst performance, and particularly catalyst performance under high load conditions.

(A method of preparing a catalyst for exhaust gas purification) A catalyst for exhaust gas purification of an embodiment of the present disclosure can be prepared by a method that includes a process of preparing first metal oxide particles supporting a catalyst metal and second metal oxide particles not supporting a catalyst metal, a process of milling the second metal oxide particles so that a secondary particle size D50 is 3 μm or less, a process of preparing a slurry which is obtained by mixing the first metal oxide particles and the milled second metal oxide particles, and a binder as necessary and in which a secondary particle size D50 of all material particles is in a range of 2 to 12 μm, and the second metal oxide particles are included in a range of 5 to 55 weight % with respect to all material particles, and a process of applying the slurry onto a substrate to form a catalyst coating layer.

The first metal oxide particles supporting a catalyst metal can be prepared by a known method in the related art, for example, any method of an impregnation method, a precipitation depositing method, and a sputtering method. In the impregnation method, for example, a precursor of a catalyst metal is dissolved in distilled water, metal oxide particles serving as supports are added and stirred, and the obtained mixture is dried and calcined for preparation.

The milling of metal oxide particles can be performed by wet grinding. Alternatively, dry grinding can be performed as long as metal oxide particles can be miniaturized. The milling of the second metal oxide particles is performed so that a secondary particle size D50 is 3 μm or less, preferably 2 μm or less and more preferably 1.5 μm or less after the milling.

The secondary particle size D50 of all material particles in the slurry prepared by mixing the first metal oxide particles and the milled second metal oxide particles may be adjusted by milling only the first metal oxide particles in advance before mixing or a mixture of the first metal oxide particles and a binder, or by mixing the first metal oxide particles and the milled second metal oxide particles in advance and milling the mixture. Any method may be used as long as a slurry in which the secondary particle size D50 of all material particles is in a range of 2 μm or more, preferably 3 μm or more and 12 μm or less, preferably 11 μm or less, and more preferably 10 μm or less can be obtained.

The first metal oxide particles and the second metal oxide particles are mixed such that a content of the second metal oxide particles with respect to all material particles is in a range of 5 to 55 weight %, preferably a range of 10 to 55 weight %, and more preferably a range of 10 to 50 weight %.

When the catalyst coating layer has a porous structure having excellent gas diffusibility, a fibrous organic substance is additionally added to the slurry. In order for the catalyst coating layer to have the above-described porosity, the fibrous organic substance is preferably added at an amount in a range of 0.5 to 9.0 parts by weight with respect to 100 parts by weight of the metal oxides included in the slurry. The fibrous organic substance is not particularly limited as long as the substance can be removed in a heating process after the slurry is applied to a substrate. For example, polyethylene terephthalate (PET) fibers, acrylic fibers, nylon fibers, rayon fibers, and cellulose fibers may be exemplified. Among these, in consideration of a balance of processability and a calcination temperature, at least one selected from the group including PET fibers and nylon fibers is preferably used. When the fibrous organic substance is included in a catalyst slurry and at least a part of the fibrous organic substance is removed in a process thereafter, it is possible to form a void having the same shape as the fibrous organic substance in the catalyst coating layer. The void formed in this manner serves as a diffusion flow path of an exhaust gas and can exhibit excellent catalyst performance even in a high load region with a high gas flow rate.

An average fiber diameter of the fibrous organic substance is preferably in a range of 1.7 to 8.0 µm. When the average fiber diameter is too small, catalyst performance becomes insufficient since an effective high aspect ratio pore is not obtained. On the other hand, when the average fiber diameter is too large, since a thickness of the catalyst coating layer increases, a pressure loss increases, and poor fuel efficiency is caused. However, such problems do not occur in the above range. In consideration of a balance of catalyst performance and a thickness of a coating, the average fiber diameter of the fibrous organic substance is in a range of 2.0 to 6.0 µm, and particularly preferably 2.0 to 5.0 µm.

In addition, an average aspect ratio of the fibrous organic substance is preferably in a range of 9 to 40. When the average aspect ratio is too small, since pore communicability becomes insufficient, gas diffusibility is insufficient. On the other hand, when the average aspect ratio is too large, since diffusibility becomes too strong, a proportion of gases that pass through the coating layer without coming in contact with a catalyst active point increases and sufficient catalyst performance is not obtained. However, such problems do not occur in the above range. The average aspect ratio of the fibrous organic substance is in a range of 9 to 30, and particularly preferably 9 to 28 in consideration of a balance of gas diffusibility and catalyst performance. Note that the average aspect ratio of the fibrous organic substance is defined as "average fiber length/average fiber diameter." Here, the fiber length is a linear distance connecting the first point and the end point of a fiber. The average fiber length can be obtained by extracting 50 fibrous organic substances or more at random and measuring and averaging fiber lengths of the fibrous organic substances. In addition, the average fiber diameter can be obtained by extracting 50 fibrous organic substances or more at random and measuring and averaging fiber diameters of the fibrous organic substances.

The slurry prepared as described above is applied to a substrate according to a method known in the related art. As the application method, a method in which the substrate is immersed (an immersion method) in a catalyst slurry for application, a wash coating method, and a method of press fitting a catalyst slurry using a press fitting unit may be exemplified. The substrate onto which the slurry is applied is dried and calcined to obtain a catalyst for exhaust gas purification.

The present disclosure will be described below in further detail with reference to examples but the present disclosure is not limited to the following examples.

1. Preparation of Catalyst (1) Comparative Example 1: Rh (0.2)/ACZ+$Al_2O_3$

A rhodium nitrate aqueous solution was used to prepare a Rh/ACZ material in which Rh was supported on an alumina-ceria-zirconia composite oxide material (a composite oxide material including $Al_2O_3$ at 30 weight %, $CeO_2$ at 20 weight %, $ZrO_2$ at 44 weight %, $Nd_2O_3$ at 2 weight %, $La_2O_3$ at 2 weight % and $Y_2O_3$ at 2 weight %; hereinafter referred to as an "ACZ material": commercially available from Daiichi Kigenso Kagaku Kogyo Co., Ltd.) according to an impregnation method. A particle size after supporting was about 200 µm. Note that, in these examples and comparative examples, particle sizes were measured using a laser diffraction particle size distribution measuring device LA920 (commercially available from HORIBA).

Next, the Rh/ACZ material and a composite $Al_2O_3$ material (initial secondary particle size D50=30 µm; hereinafter simply referred to as an "$Al_2O_3$ material": commercially available from Astamuse company) containing $La_2O_3$ at 1 weight % and an $Al_2O_3$-based binder were added to and suspended in distilled water with stirring to prepare a slurry. The obtained slurry was subjected to wet milling so that a particle size D50 of all materials was a predetermined value.

The obtained slurry was poured into a honeycomb structure substrate (600 cells, hexagonal, a wall thickness of 2 mil) made of cordierite and having volume of an 875 cc and unnecessary portions were then blown off using a blower to coat a wall surface of the substrate. In the coating, Rh was contained at 0.2 g/L, the $Al_2O_3$ material was contained at 50 g/L, and the Rh/ACZ material was contained at 130 g/L with respect to a volume of the substrate. After the coating, moisture was removed using a dryer at 120° C. for 2 hours. Then, calcination was performed in an electric furnace at 500° C. for 2 hours to obtain a catalyst.

(2) Comparative Example 2: Rh (0.2)/ACZ+$Al_2O_3$

A Rh/ACZ material was prepared in the same manner as in Comparative Example 1. A particle size after supporting was about 200 µm. Separately, an $Al_2O_3$ material and an $Al_2O_3$-based binder were added to and suspended in distilled water with stirring to prepare a slurry. The obtained slurry was subjected to wet milling so that a particle size D50 of all materials of the finally obtained slurry was a predetermined value. A Rh/ACZ material having a secondary particle size D50 that was set to a predetermined value according to wet milling in advance was added thereto.

The obtained slurry was poured into the same substrate as in Comparative Example 1 and unnecessary portions were then blown off using a blower to coat a wall surface of the substrate. Amounts of materials contained in the coating were the same as those in Comparative Example 1. After the coating, moisture was removed using a dryer at 120° C. for 2 hours. Then, calcination was performed in an electric furnace at 500° C. for 2 hours to obtain a catalyst.

(3) Examples 1 to 2 and Comparative Example 3: Rh (0.2)/ACZ+Al$_2$O$_3$

A Rh/ACZ material was prepared in the same manner as in Comparative Example 1. A particle size after supporting was about 200 μm. Next, the Rh/ACZ material and an Al$_2$O$_3$-based binder were added to and suspended in distilled water with stirring to prepare a slurry. The obtained slurry was subjected to wet milling so that a particle size D50 of all materials of the finally obtained slurry was a predetermined value. An Al$_2$O$_3$ material having a secondary particle size D50 that was set to a predetermined value according to wet milling in advance was added thereto.

The obtained slurry was poured into the same substrate as in Comparative Example 1 and unnecessary portions were then blown off using a blower to coat a wall surface of the substrate. Amounts of materials contained in the coating were the same as those in Comparative Example 1. After the coating, moisture was removed using a dryer at 120° C. for 2 hours. Then, calcination was performed in an electric furnace at 500° C. for 2 hours to obtain a catalyst.

(4) Comparative Examples 4 to 7 and 9 to 11: Rh (0.15)/ACZ+Al$_2$O$_3$

[Use of pore forming material] A slurry was prepared in the same manner as in Comparative Example 1. The obtained slurry was subjected to wet milling so that a particle size D50 of all materials was a predetermined value. A pore forming material which was a PET fiber having a cross sectional diameter of 3 μm and a length of 50 μm was added thereto at 3 weight %.

The obtained slurry was poured into the same substrate as in Comparative Example 1 and unnecessary portions were then blown off using a blower to coat a wall surface of the substrate. In the coating, Rh was contained at 0.15 g/L and a composite Al$_2$O$_3$ material and a Rh/ACZ material were contained at amounts shown in the following Tables 1A and 1B with respect to a volume of the substrate. After the coating, moisture was removed using a dryer at 120° C. for 2 hours. Then, calcination was performed in an electric furnace at 500° C. for 2 hours to obtain a catalyst.

(5) Comparative Example 8: Rh (0.15)/ACZ+Al$_2$O$_3$

A catalyst was obtained according to the same processes as in Comparative Examples 4 to 7 and 9 to 11 except that no pore forming material was added to the slurry.

(6) Examples 3 to 10 and Comparative Examples 12 and 13: Rh (0.15)/ACZ+Al$_2$O$_3$

[Use of pore forming material] A Rh/ACZ material was prepared in the same manner as in Comparative Example 1. A particle size after supporting was about 200 μm. The Rh/ACZ material and an Al$_2$O$_3$-based binder were added to and suspended in distilled water with stirring to prepare a slurry. The obtained slurry was subjected to wet milling so that a particle size D50 of all materials of the finally obtained slurry was a predetermined value. An Al$_2$O$_3$ material having a secondary particle size D50 that was set to a predetermined value according to wet milling in advance and a pore forming material which was a PET fiber having a cross sectional diameter of 3 μm and a length of 50 μm were added thereto at 3 weight %.

The obtained slurry was poured into the same substrate as in Comparative Example 1 and unnecessary portions were then blown off using a blower to coat a wall surface of the substrate. In the coating, Rh was contained at 0.15 g/L and a composite Al$_2$O$_3$ material and a Rh/ACZ material were contained at amounts shown in the following Tables 1A and 1B with respect to a volume of the substrate. After the coating, moisture was removed using a dryer at 120° C. for 2 hours. Then, calcination was performed in an electric furnace at 500° C. for 2 hours to obtain a catalyst.

TABLE 1A

| | Catalyst configuration | | | | | Particle size distribution | | |
|---|---|---|---|---|---|---|---|---|
| | Rh (g/L) | Al$_2$O$_3$ (g/L) | ACZ (g/L) | Binder (g/L) | Proportion of Al$_2$O$_3$ with respect to all (wt %) | Coating amount (g/L) | Secondary particle size D50 of Al$_2$O$_3$ (μm) | Secondary particle size D50 of all materials (μm) | Use of pore forming material |
| Comparative Example 1 | 0.2 | 50 | 130 | 3 | 27.3 | 183 | 7.0 | 5.9 | — |
| Comparative Example 2 | 0.2 | 50 | 130 | 3 | 27.3 | 183 | 13.2 | 5.6 | — |
| Example 1 | 0.2 | 50 | 130 | 3 | 27.3 | 183 | 0.6 | 5.4 | — |
| Example 2 | 0.2 | 50 | 130 | 3 | 27.3 | 183 | 3.0 | 5.8 | — |
| Comparative Example 3 | 0.2 | 50 | 130 | 3 | 27.3 | 183 | 6.0 | 5.7 | — |
| Comparative Example 4 | 0.15 | 50 | 190 | 3 | 20.6 | 243 | 3.2 | 2.2 | ○ |
| Comparative Example 5 | 0.15 | 50 | 190 | 3 | 20.6 | 243 | 5.3 | 4.7 | ○ |
| Comparative Example 6 | 0.15 | 50 | 190 | 3 | 20.6 | 243 | 13.2 | 10.2 | ○ |
| Comparative Example 7 | 0.15 | 50 | 190 | 3 | 20.6 | 243 | 5.1 | 4.2 | ○ |
| Comparative Example 8 | 0.15 | 50 | 190 | 3 | 20.6 | 243 | 5.1 | 4.2 | — |
| Comparative Example 9 | 0.15 | 25 | 222 | 3 | 10.0 | 250 | 6.2 | 5.8 | ○ |

TABLE 1A-continued

| | Catalyst configuration | | | | | Particle size distribution | | |
|---|---|---|---|---|---|---|---|---|
| | Rh (g/L) | Al₂O₃ (g/L) | ACZ (g/L) | Binder (g/L) | Proportion of Al₂O₃ with respect to all (wt %) | Coating amount (g/L) | Secondary particle size D50 of Al₂O₃ (μm) | Secondary particle size D50 of all materials (μm) | Use of pore forming material |
| Comparative Example 10 | 0.15 | 126 | 117 | 3 | 51.2 | 246 | 6.5 | 6.3 | ○ |
| Comparative Example 11 | 0.15 | 150 | 92 | 3 | 61.2 | 245 | 6.3 | 5.7 | ○ |

TABLE 1B

| | Catalyst configuration | | | | | Particle size distribution | | |
|---|---|---|---|---|---|---|---|---|
| | Rh (g/L) | Al₂O₃ (g/L) | ACZ (g/L) | Binder (g/L) | Proportion of Al₂O₃ with respect to all (wt %) | Coating amount (g/L) | Secondary particle size D50 of Al₂O₃ (μm) | Secondary particle size D50 of all materials (μm) | Use of pore forming material |
| Example 3 | 0.15 | 50 | 190 | 3 | 20.6 | 243 | 0.9 | 2.1 | ○ |
| Example 4 | 0.15 | 50 | 190 | 3 | 20.6 | 243 | 0.9 | 3.8 | ○ |
| Example 5 | 0.15 | 50 | 190 | 3 | 20.6 | 243 | 0.9 | 5.4 | ○ |
| Example 6 | 0.15 | 50 | 190 | 3 | 20.6 | 243 | 0.9 | 6.5 | ○ |
| Example 7 | 0.15 | 50 | 190 | 3 | 20.6 | 243 | 0.9 | 10.3 | ○ |
| Example 8 | 0.15 | 25 | 222 | 3 | 10.0 | 250 | 1.2 | 5.8 | ○ |
| Example 9 | 0.15 | 51 | 192 | 3 | 20.7 | 246 | 0.6 | 5.1 | ○ |
| Example 10 | 0.15 | 100 | 143 | 3 | 40.7 | 246 | 1.2 | 5.9 | ○ |
| Example 11 | 0.15 | 126 | 117 | 3 | 51.2 | 246 | 1.4 | 4.9 | ○ |
| Comparative Example 12 | 0.15 | 150 | 92 | 3 | 61.2 | 245 | 0.8 | 5.3 | ○ |

2. Evaluation (1)

A durability test was performed by providing catalysts for exhaust gas purification in an exhaust system having a V type 8 cylinder engine and repeatedly flowing exhaust gases of rich, stoichiometric and lean atmospheres for a certain time at a catalyst bed temperature 1000° C. for 50 hours.

(2) Evaluation of Purification Performance Under High Ga Conditions

After the durability test, an exhaust gas with an air-fuel ratio (A/F) of 14.4 was supplied to the catalysts for exhaust gas purification, a temperature rise characteristic (to 500° C.) under high Ga conditions (an amount of intake air Ga=35 g/s) was evaluated, and a temperature (T50-NOx) at which a NOx purification rate was 50% was measured and evaluated as an indicator of catalyst activity. In addition, a NOx purification rate (a NOx purification rate during a high load) at 450° C. in a steady state was calculated and evaluated as an indicator of purification performance in a gas diffusion rate determining region.

(3) Measurement of Pressure Loss

Air was flowed to the catalysts at room temperature and a flow rate of 7 m³/min, and a pressure loss was calculated from a backpressure and used as an indicator of a thickness of a coating layer.

3. Results (1) SEM Observation of Catalyst Coating Layer

Figure 1A:
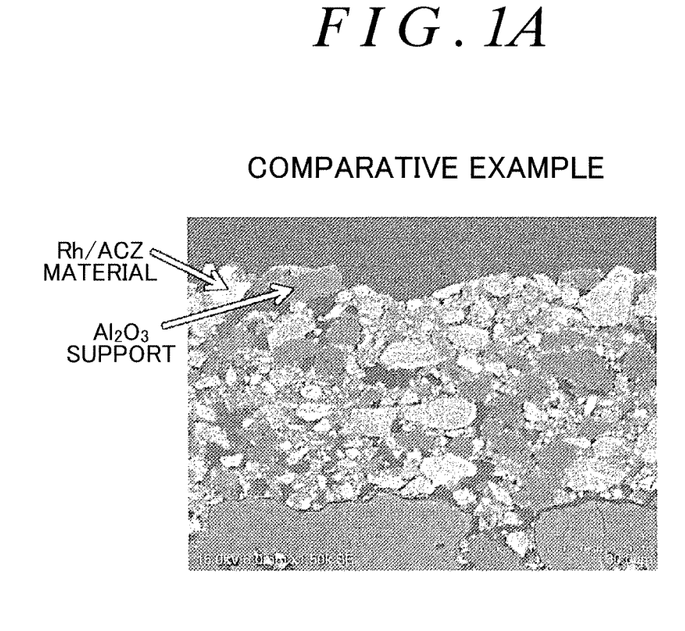
FIG. 1A shows an SEM image of a cross section of a catalyst coating layer of a catalyst obtained in Comparative Example 1.
Figure 1B:
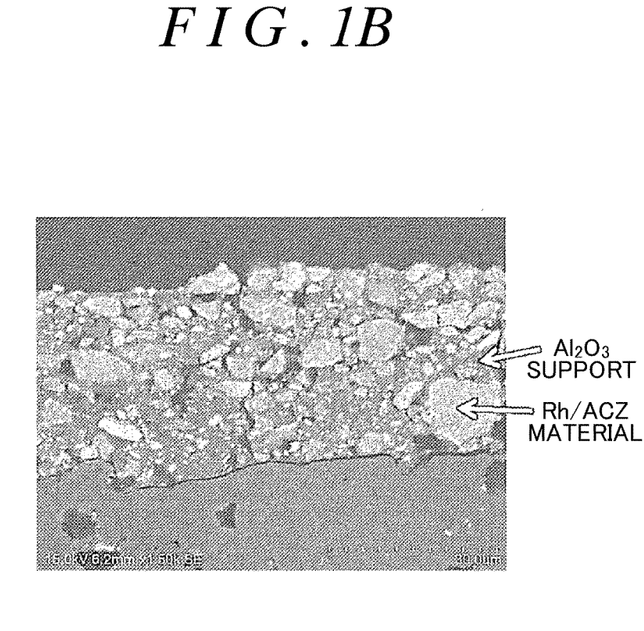
FIG. 1B shows an SEM image of a cross section of a catalyst coating layer of a catalyst obtained in Example 1.

FIGS. 1A and 1B show SEM images of cross sections of the catalyst coating layer of the catalysts obtained in Comparative Example 1 and Example 1. In the coating layer of Comparative Example 1 in FIG. 1A, the Rh/ACZ material and the Al₂O₃ material have similar particle sizes. On the other hand, it was confirmed that, in the coating layer of Example 1 in FIG. 1B, the particle size of the Al₂O₃ material was small but the particle size of the Rh/ACZ material was large and there was less fine powder, and the coating layer was thinner than that of Comparative Example 1.

(2) Evaluation Results of Catalysts

Evaluation results of the catalysts are shown in Table 2.

TABLE 2

| | T50-NOx (° C.) | NOx purification rate during high load (%) | Pressure loss (kPa) |
|---|---|---|---|
| Comparative Example 1 | 352.0 | 94.3 | 1.97 |
| Comparative Example 2 | 374.0 | 91.2 | 1.82 |
| Example 1 | 332.7 | 99.9 | 1.86 |
| Example 2 | 353.1 | 96.6 | 1.88 |
| Comparative Example 3 | 360.2 | 94.0 | 1.95 |
| Comparative Example 4 | 379.3 | 88.7 | 2.24 |
| Comparative Example 5 | 369.3 | 91.4 | 2.45 |
| Comparative Example 6 | 371.3 | 91.5 | 2.55 |
| Comparative Example 7 | 368.4 | 91.1 | 2.38 |
| Comparative Example 8 | 375.1 | 81.5 | 2.37 |
| Comparative Example 9 | 367.0 | 89.0 | 2.36 |
| Comparative Example 10 | 382.3 | 86.7 | 2.41 |
| Comparative Example 11 | 381.0 | 84.0 | 2.40 |
| Example 3 | 377.0 | 89.2 | 2.22 |
| Example 4 | 363.4 | 94.0 | 2.25 |
| Example 5 | 358.5 | 93.7 | 2.29 |
| Example 6 | 360.6 | 93.6 | 2.41 |
| Example 7 | 357.0 | 92.3 | 2.48 |

TABLE 2-continued

|  | T50-NOx (° C.) | NOx purification rate during high load (%) | Pressure loss (kPa) |
|---|---|---|---|
| Example 8 | 363.0 | 90.1 | 2.33 |
| Example 9 | 361.7 | 93.4 | 2.34 |
| Example 10 | 370.5 | 93.2 | 2.35 |
| Example 11 | 376.9 | 88.5 | 2.35 |
| Comparative Example 12 | 387.5 | 82.2 | 2.36 |

Figure 2:
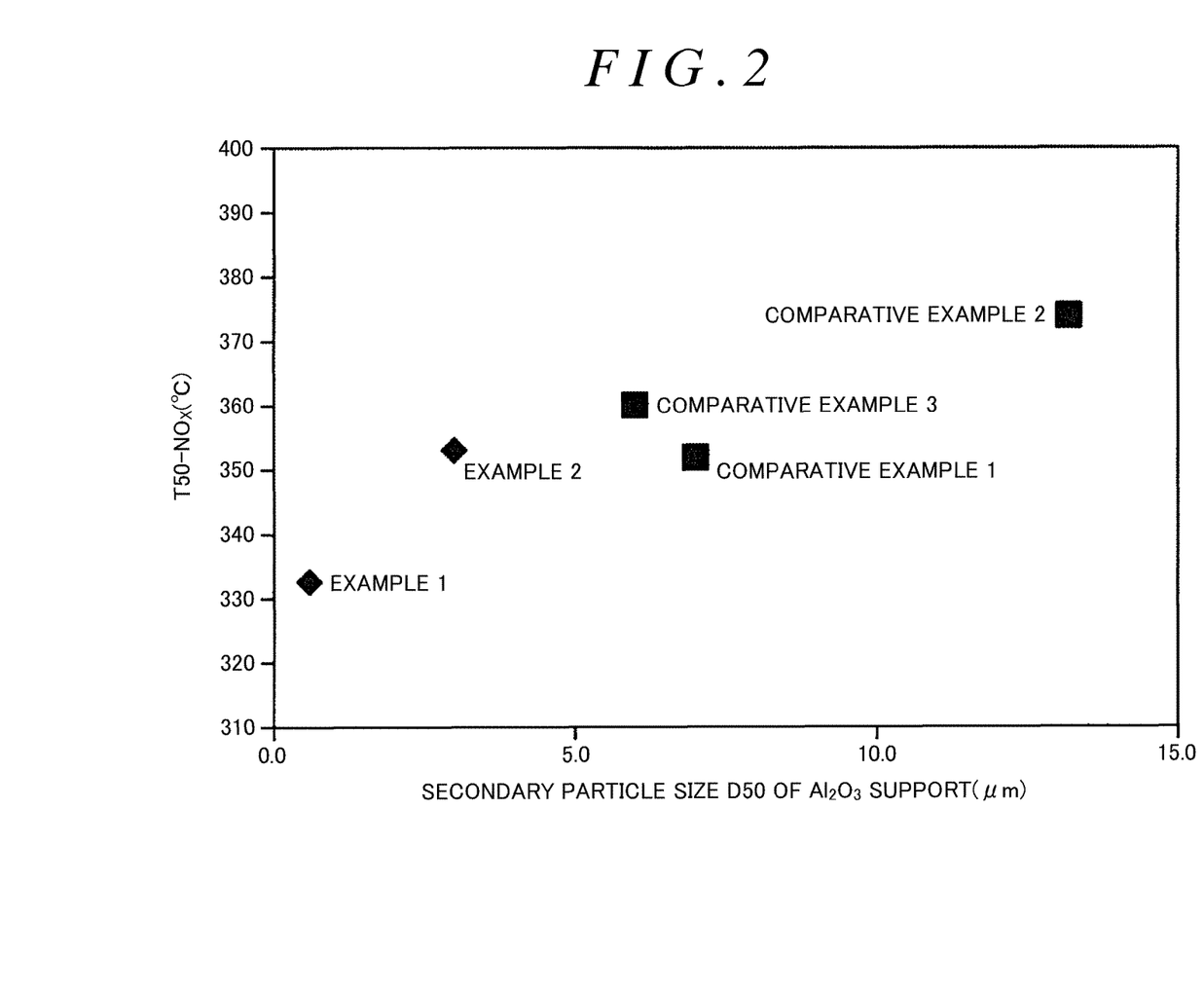
FIG. 2 is a graph showing a relation between a secondary particle size D50 and a T50-NOx of $Al_2O_3$ materials of catalysts of Examples 1 to 2 and Comparative Examples 1 to 3.
Figure 3:
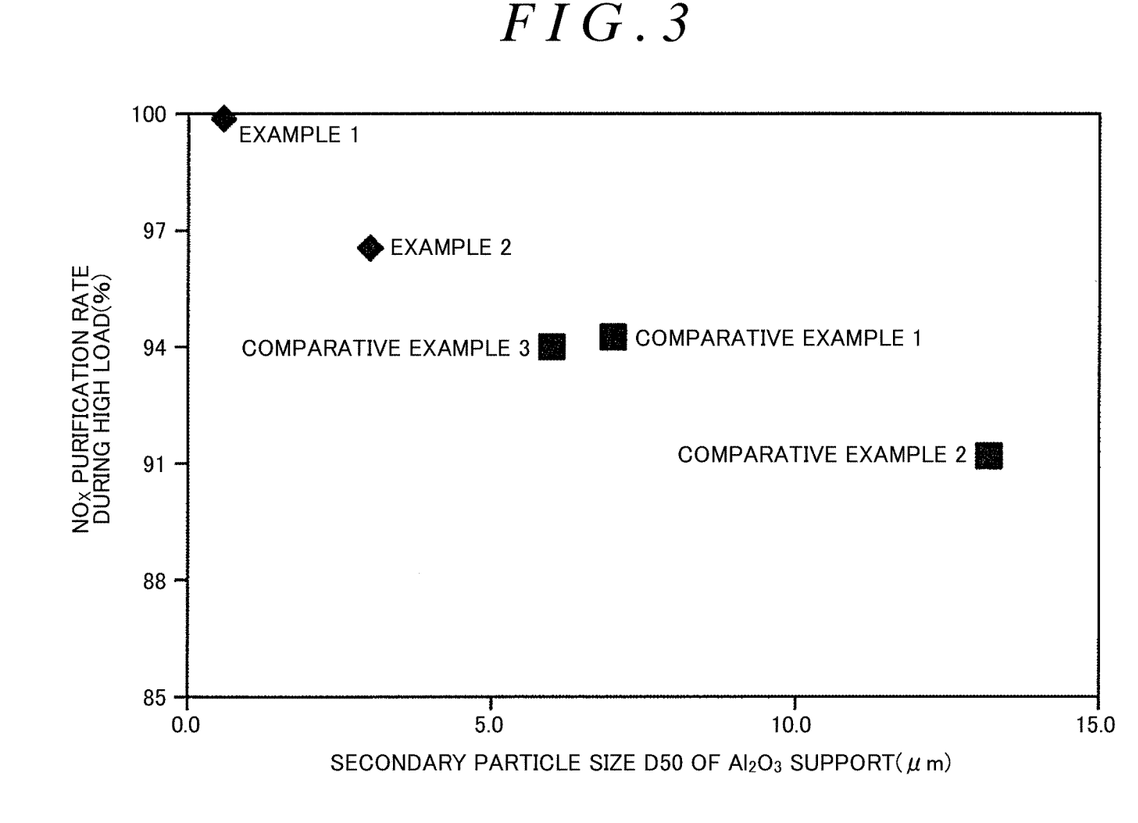
FIG. 3 is a graph showing a relation between a secondary particle size D50 and a NOx purification rate during a high load of $Al_2O_3$ materials of catalysts of Examples 1 to 2 and Comparative Examples 1 to 3.
Figure 4:
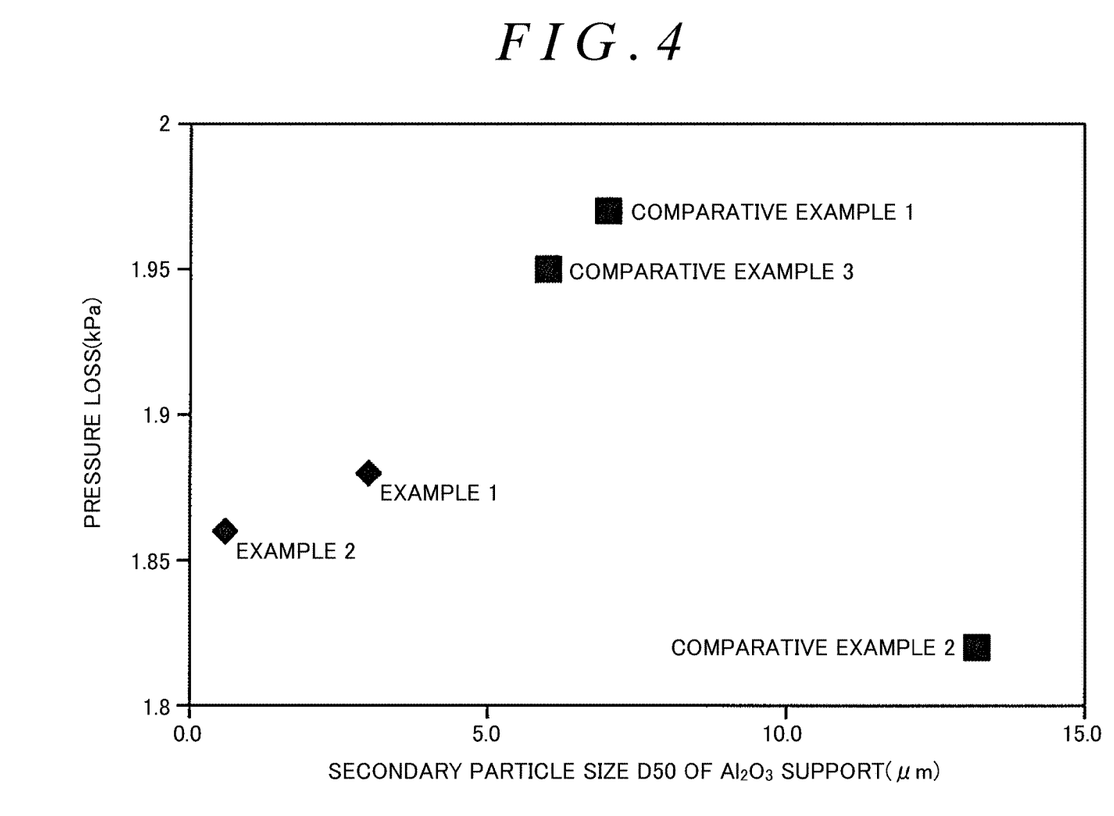
FIG. 4 is a graph showing a relation between a secondary particle size D50 and a pressure loss of $Al_2O_3$ materials of catalysts of Examples 1 to 2 and Comparative Examples 1 to 3.

FIGS. 2 to 4 are graphs showing relations of a secondary particle size D50 of the Al$_2$O$_3$ materials of the catalysts of Examples 1 to 2 and Comparative Examples 1 to 3 with a T50-NOx, a NOx purification rate during a high load and a pressure loss. The catalysts of Examples 1 and 2 in which the secondary particle size D50 of the Al$_2$O$_3$ material was 3 μm or less had more excellent durability than the catalysts of Comparative Examples 1 to 3. In addition, the thickness of the coating layer was inferred to be reduced due to a low pressure loss.

Note that, in the catalyst of Comparative Example 2, the particle size of the Al$_2$O$_3$ material was relatively large, but the particle size of all materials was the same as those of the other comparative examples and examples, and the particle size of the ACZ material was smaller than those of the others. In the catalyst of Comparative Example 2, a decrease in the thickness of the coating layer was confirmed from a low pressure loss, but this resulted in inferior durability to the others. This indicates that a decrease in a particle size of the ACZ material supporting Rh serving as a catalyst metal caused a decrease in durability.

Figure 5:
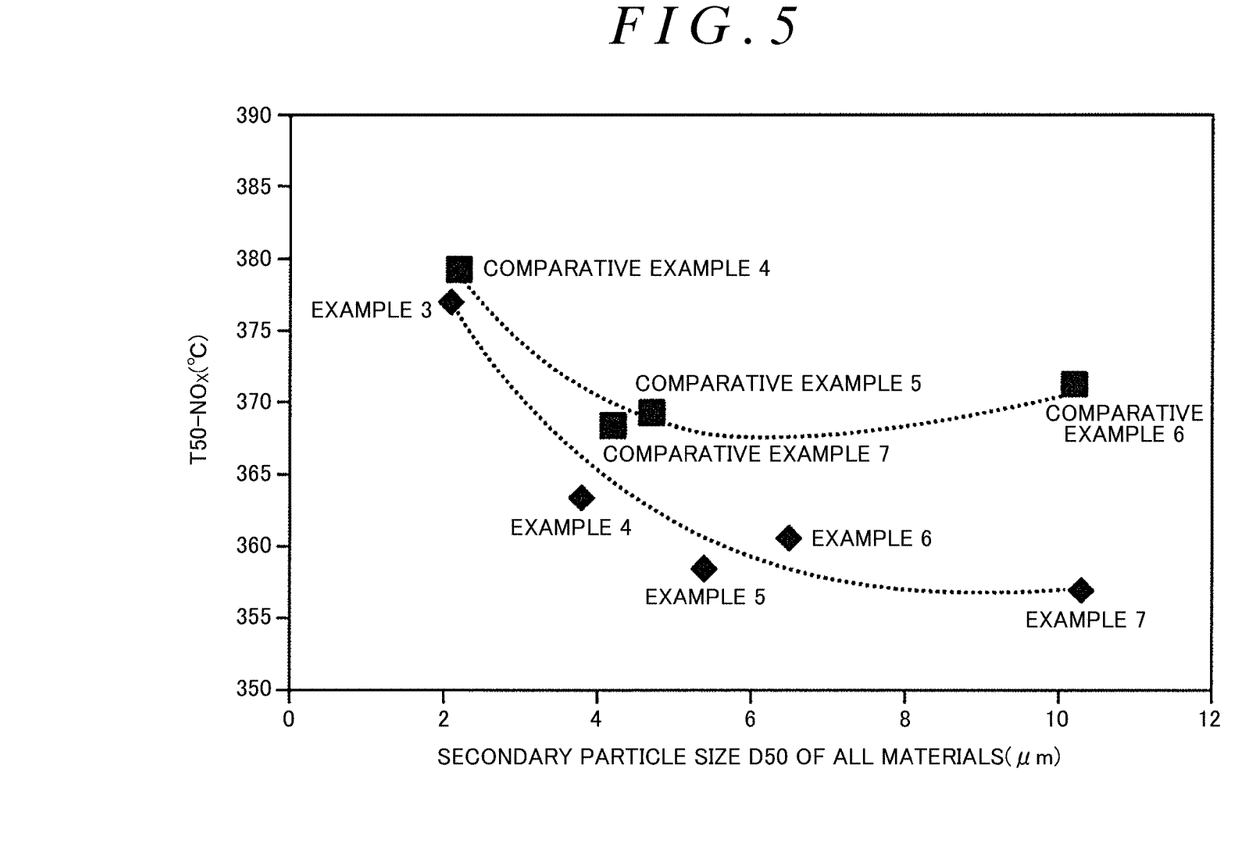
FIG. 5 is a graph showing a relation between a secondary particle size D50 and a T50-NOx of all materials of catalysts of Examples 3 to 7 and Comparative Examples 4 to 7.
Figure 6:
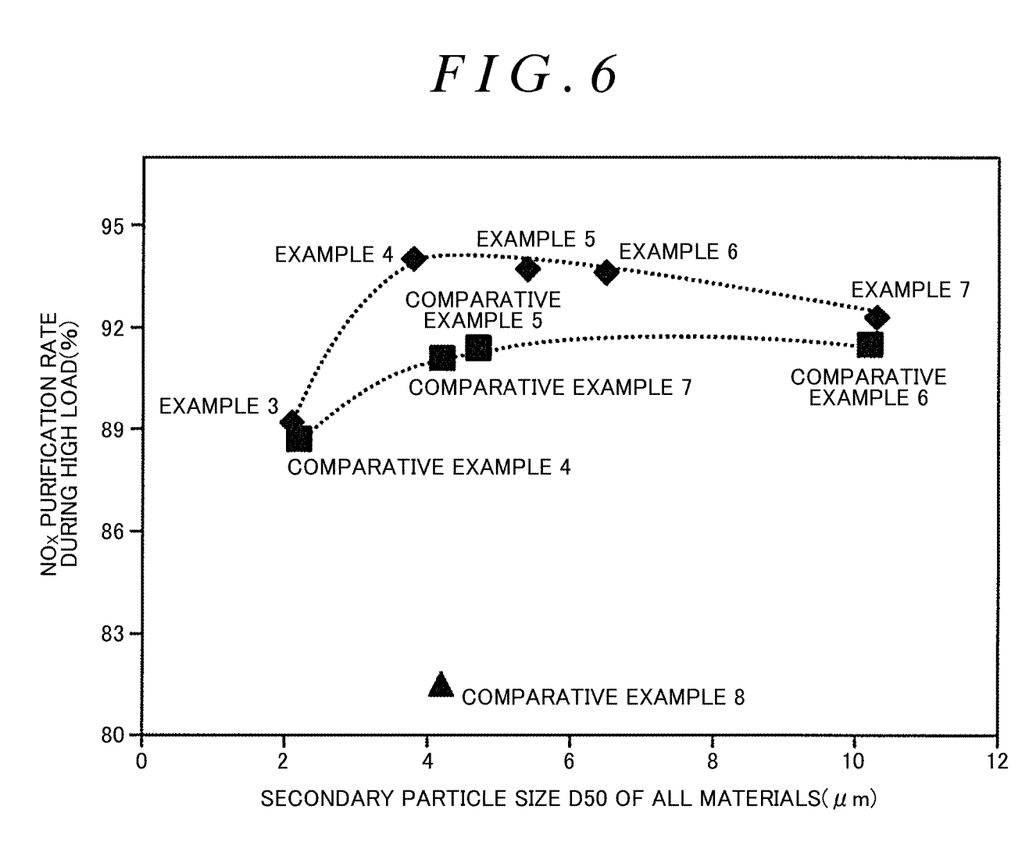
FIG. 6 is a graph showing a relation between a secondary particle size D50 and a NOx purification rate during a high load of all materials of catalysts of Examples 3 to 7 and Comparative Examples 4 to 7.
Figure 7:
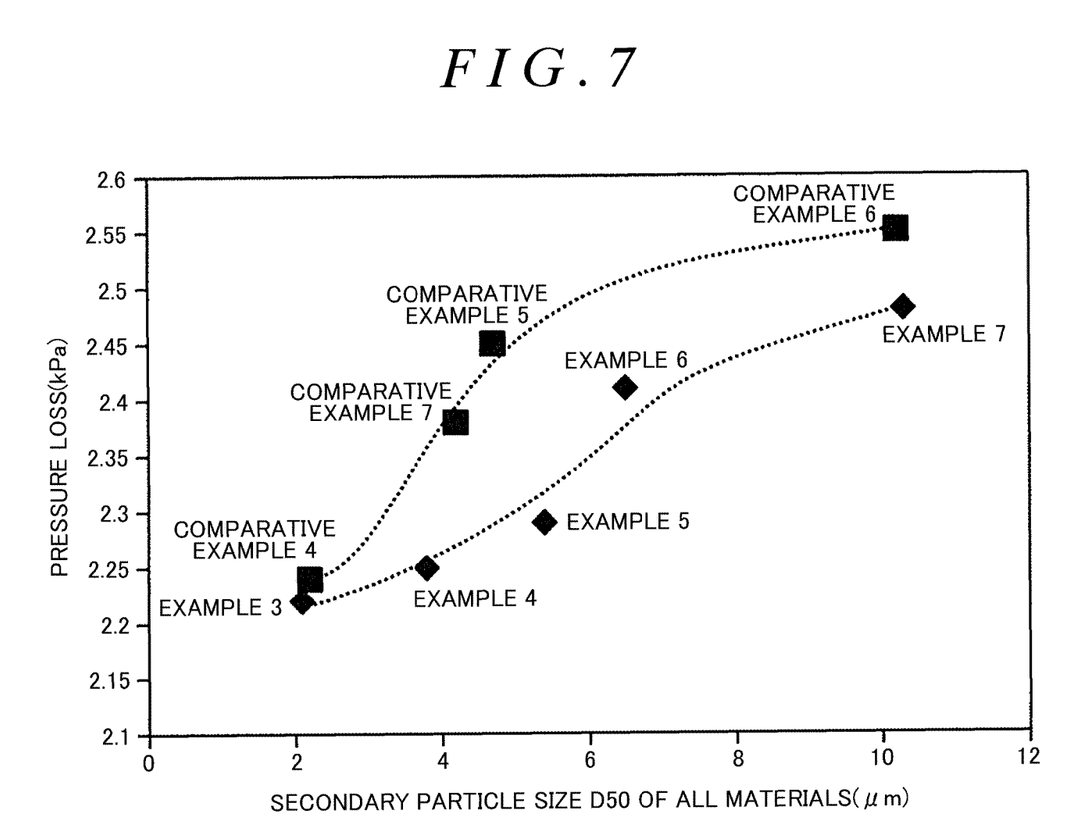
FIG. 7 is a graph showing a relation between a secondary particle size D50 and a pressure loss of all materials of catalysts of Examples 3 to 7 and Comparative Examples 4 to 7.

FIGS. 5 to 7 are graphs showing relations of a secondary particle size D50 of all materials of the catalysts of Examples 3 to 7 and Comparative Examples 4 to 7 with a T50-NOx, a NOx purification rate during a high load and a pressure loss. The catalysts of Examples 3 to 7 in which the secondary particle size D50 of the Al$_2$O$_3$ material was 3 μm or less had more excellent durability and a smaller pressure loss than the catalysts of Comparative Examples 4 to 7 in which the secondary particle size D50 of all materials was similar to those of the above examples. The superiority of the catalysts of Examples 3 to 7 was confirmed when the secondary particle size D50 of all materials was in a range of at least 2 μm or more and particularly 3 μm or more, and 12 μm or less and particularly 11 μm or less. Also, in Comparative Examples 7 and 8 which differ in terms of the use of a pore forming material, comparing NOx purification rates during a high load, it can be understood that the use of the pore forming material greatly influenced purification performance during a high load.

Figure 8:
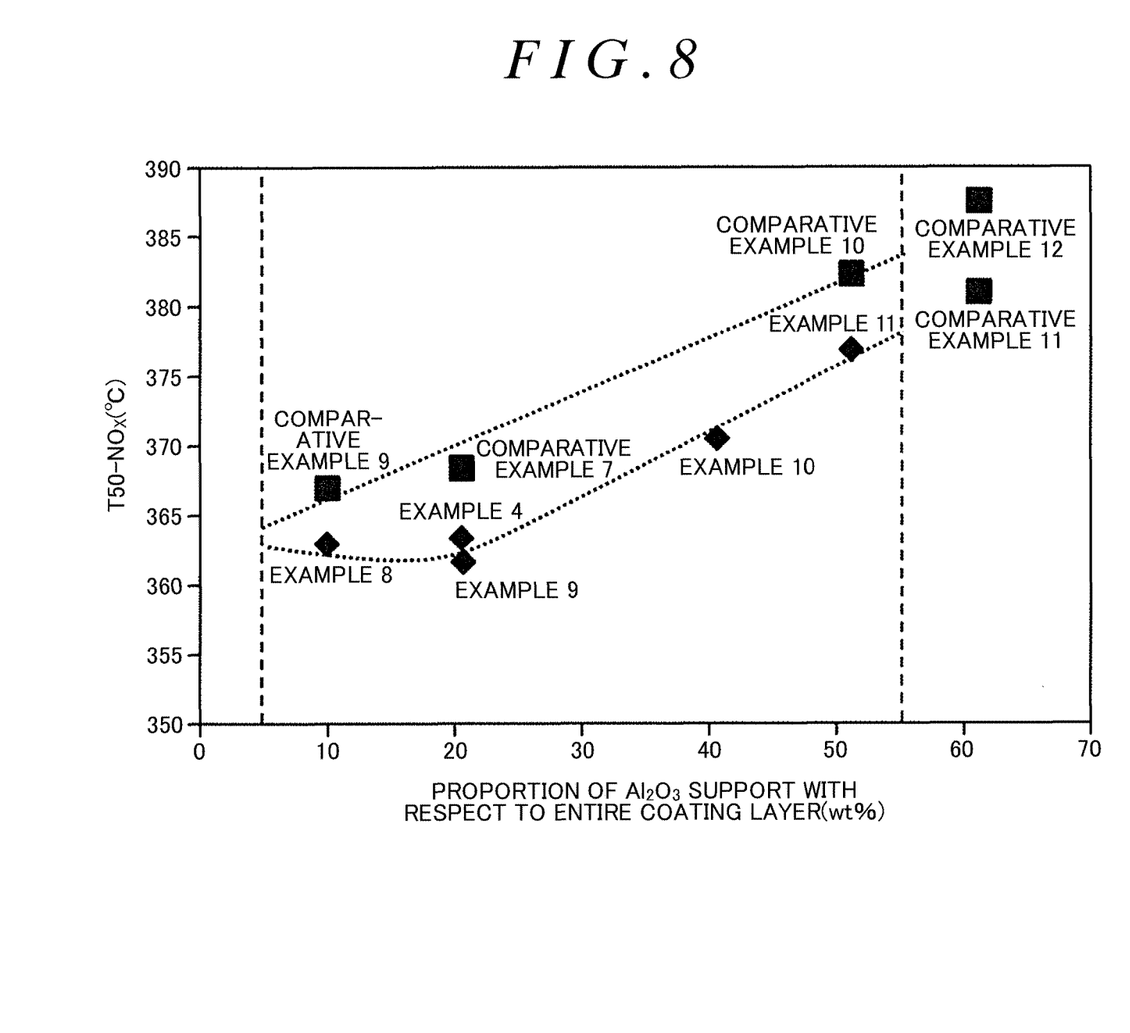
FIG. 8 is a graph showing a relation between proportions (weight %) of $Al_2O_3$ materials of catalysts of Examples 4 and 8 to 11 and Comparative Examples 7 and 9 to 12 with respect to the entire coating layer and a T50-NOx.
Figure 9:
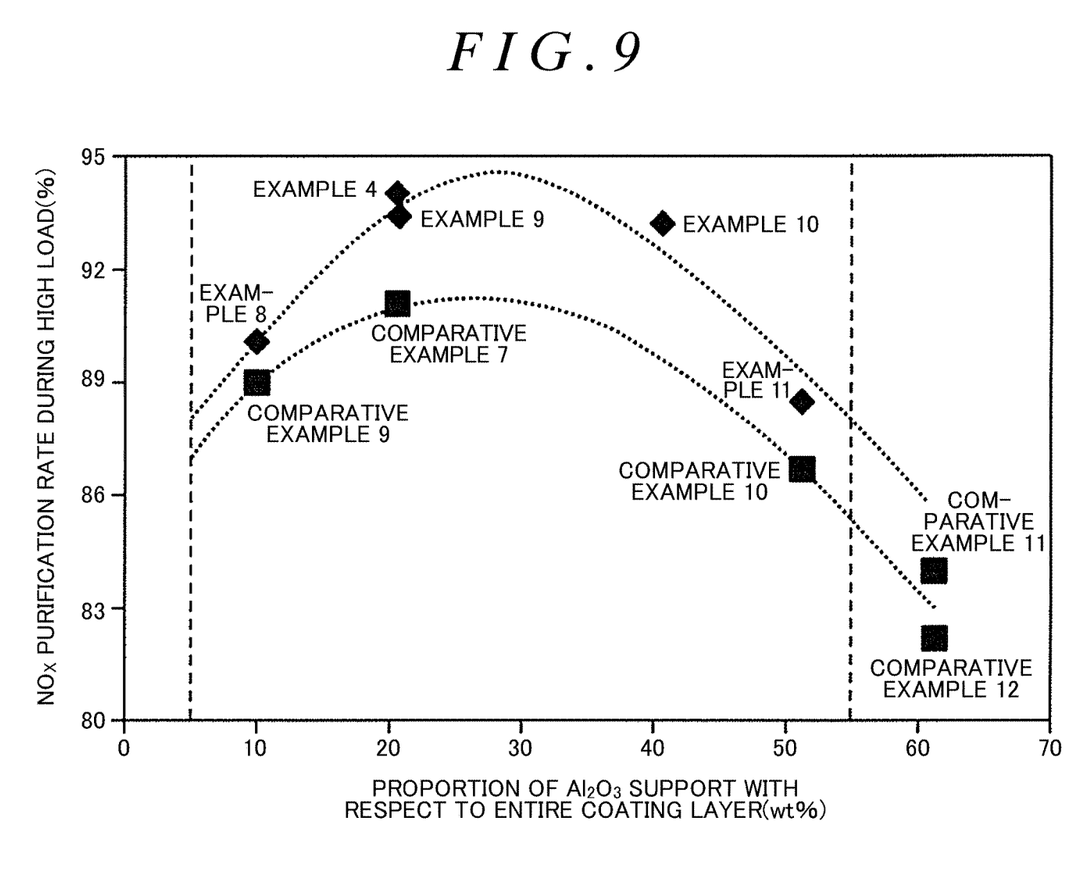
FIG. 9 is a graph showing a relation between proportions (weight %) of $Al_2O_3$ materials of catalysts of Examples 4 and 8 to 11 and Comparative Examples 7 and 9 to 12 with respect to the entire coating layer and a NOx purification rate during a high load.

FIGS. 8 and 9 are graphs showing relations of a proportion (weight %) of the Al$_2$O$_3$ materials with respect to the entire coating layer of the catalysts of Examples 4 and 8 to 11 and Comparative Examples 7 and 9 to 12 with a T50-NOx and a NOx purification rate during a high load. When the proportion of the Al$_2$O$_3$ material was less than 5 weight % with respect to the entire coating layer, since peeling off and the like occurred, coating could not be appropriately performed. However, when the proportion was greater, for example, in a range from 5 weight % and particularly 10 weight % to 55 weight % or less, improvement of durability was confirmed. Also, it was inferred that, when the proportion of the Al$_2$O$_3$ material was in a region greater than 55 weight %, a decrease in heat resistance due to the decreased particle size of the Al$_2$O$_3$ material influenced the entire catalyst and thus durability was decreased.

What is claimed is:

1. A catalyst for exhaust gas purification, comprising:
   a substrate; and
   a catalyst coating layer provided on the substrate,
   wherein the catalyst coating layer comprises material particles,
   the material particles include first metal oxide particles and second metal oxide particles,
   the second metal oxide particles have a content ratio of 5 to 55 weight % with respect to all the material particles of the catalyst coating layer,
   the first metal oxide particles have a catalyst metal supported thereon,
   the second metal oxide particles do not have a catalyst metal supported thereon,
   a secondary particle size D50 of all the first metal oxide particles having the catalyst metal supported thereon and the second metal oxide particles not having a catalyst metal supported thereon is in a range of 2 to 12 μm,
   the second metal oxide particles have a secondary particle size D50 that is 3 μm or less and,
   a secondary particle size D50 of the first metal oxide particles is greater than the secondary particle size D50 of the second metal oxide particles, and
   the second metal oxide particles are not supported on the first metal oxide particles.

2. The catalyst for exhaust gas purification according to claim 1,
   wherein a covering amount of the catalyst coating layer is in a range of 50 to 300 g/L, per unit volume of the substrate.

3. The catalyst for exhaust gas purification according to claim 1,
   wherein a porosity of the catalyst coating layer is in a range of 50 to 80 volume % as a porosity measured according to an underwater gravimetric method,
   wherein an equivalent circle diameter of a pore in a cross-sectional image of a cross section of the catalyst coating layer perpendicular to a direction of the substrate in which an exhaust gas flows among pores included in the catalyst coating layer is in a range of 2 to 50 μm, and
   wherein an aspect ratio pore having an aspect ratio of 5 or more is 0.5 to 50 volume % with respect to all voids included in the catalyst coating layer and an average aspect ratio thereof is in a range of 10 to 50.

4. The catalyst for exhaust gas purification according to claim 1,
   wherein the catalyst metal is at least one selected from the group consisting of platinum (Pt), palladium (Pd), rhodium (Rh), gold (Au), silver (Ag), iridium (Ir) and ruthenium (Ru).

5. The catalyst for exhaust gas purification according to claim 1, wherein the first metal oxide particles comprise alumina, and the second metal oxide particles comprise 50 weight % or more of alumina based on a total content of the second metal oxide particles.

6. A method of preparing a catalyst for exhaust gas purification comprising:
   obtaining first metal oxide particles having a catalyst metal supported thereon;
   obtaining second metal oxide particles not having a catalyst metal supported thereon;
   milling the second metal oxide particles to obtain milled second metal oxide particles having a secondary particle size D50 of 3 μm or less;

preparing a slurry which is obtained by mixing the first metal oxide particles and the milled second metal oxide particles, wherein a secondary particle size D50 of the first metal oxide particles having the catalyst metal supported thereon and the second metal oxide particles not having a catalyst metal supported thereon of the slurry is in a range of 2 to 12 μm, and wherein the second metal oxide particles are included in a range of 5 to 55 weight % with respect to all the first metal oxide particles having the catalyst metal supported thereon and the second metal oxide particles not having a catalyst metal supported thereon; and applying the slurry onto a substrate to form a catalyst coating layer, wherein the second metal oxide particles are not supported on the first metal oxide particles.

7. The method according to claim 6, wherein a fibrous organic substance is additionally added to the slurry.

8. The method according to claim 6, wherein the catalyst metal is at least one selected from the group consisting of platinum (Pt), palladium (Pd), rhodium (Rh), gold (Au), silver (Ag), iridium (Ir) and ruthenium (Ru).

* * * * *